UNITED STATES PATENT OFFICE.

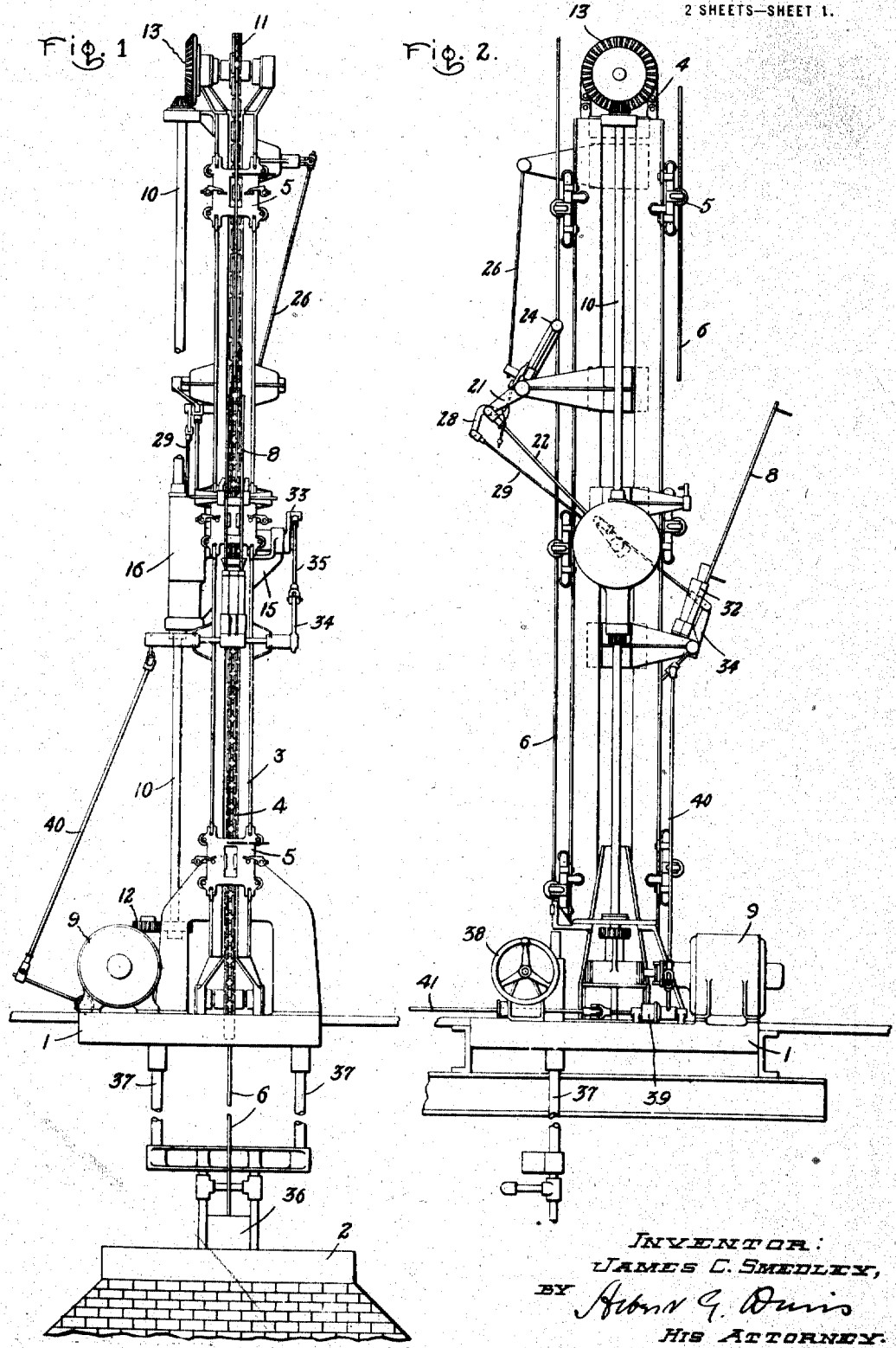

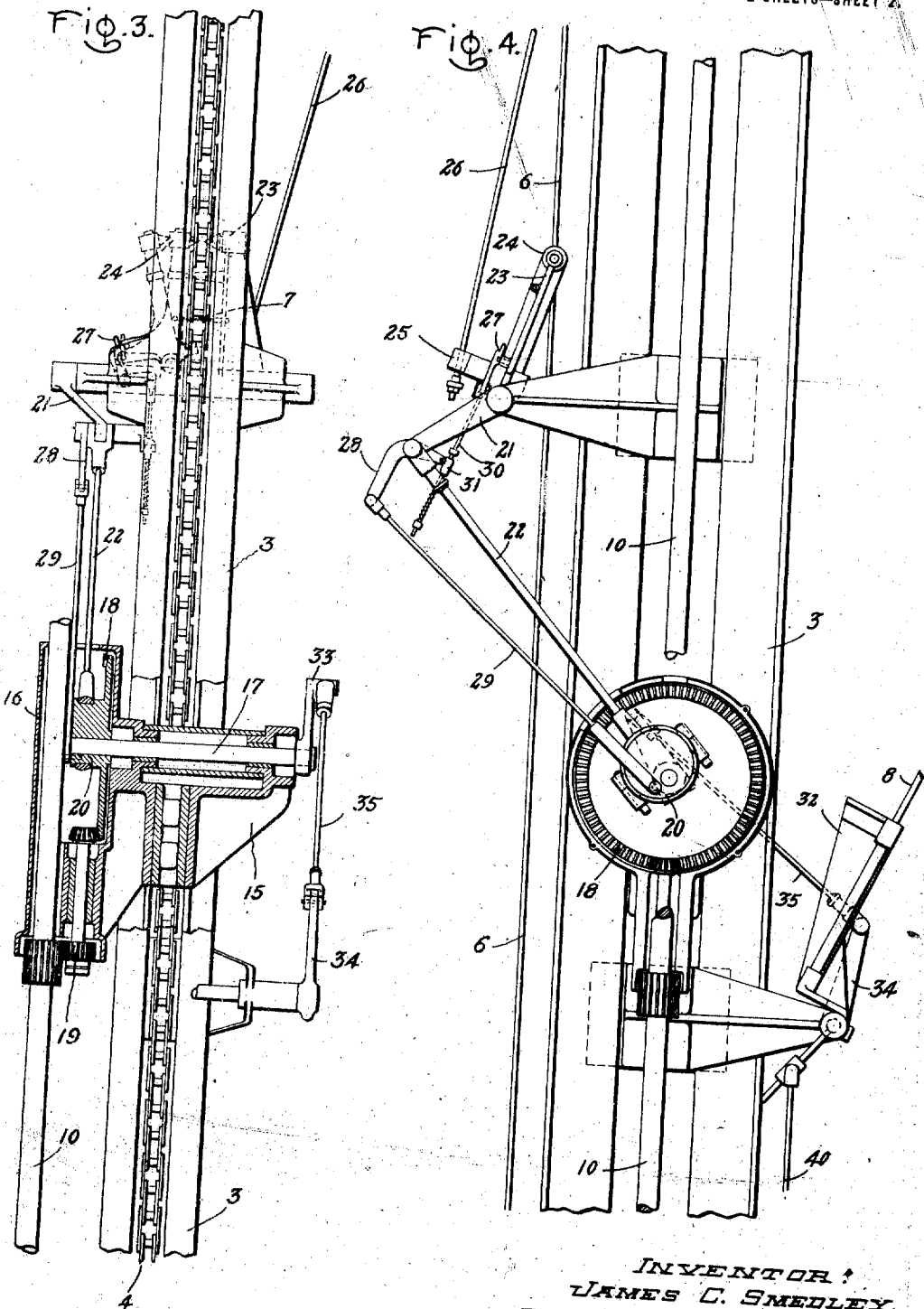

JAMES C. SMEDLEY, OF CLEVELAND, OHIO, ASSIGNOR TO GENERAL ELECTRIC COMPANY, A CORPORATION OF NEW YORK.

APPARATUS FOR DRAWING CANE-GLASS AND GLASS TUBING.

1,278,046.  Specification of Letters Patent.  Patented Sept. 3, 1918.

Application filed December 22, 1916. Serial No. 138,357.

*To all whom it may concern:*

Be it known that I, JAMES C. SMEDLEY, a citizen of the United States, residing at Cleveland, in the county of Cuyahoga, State of Ohio, have invented certain new and useful Improvements in Apparatus for Drawing Cane-Glass and Glass Tubing, of which the following is a specification.

My invention relates to an apparatus for drawing cane glass and glass tubing, and particularly to apparatus of the type set forth in the Quackenbush and Smedley application, Serial No. 94,463, filed April 29, 1916.

The object of my invention is to improve apparatus of this type whereby the speed of cane production may be substantially increased without increasing materially the percentage of cane breakage.

The machine of the aforesaid application embodies a continuous vertically disposed conveyer with gripping and drawing devices attached thereto at suitable intervals combined with automatically adjustable cooling and chilling devices, automatically operated cutting or breaking devices, and automatically operated delivery devices, the control of said devices being effected directly through the gripping devices and conveyer.

It was found that the speed of cane production could not be increased beyond certain limits because of abnormal breakage when the speed of drawing was increased beyond these limits. I have found this increased breakage at the higher speeds to be due to the manner of actuating the chilling, cutting and delivery devices, and more specifically to the manner of actuating these devices directly through the chain conveyer. Apparently the blows delivered to the chain at the actuating points at the higher speeds are often sufficient to break the cane and tubing, the latter being of very small dimensions, as, for instance, the cane and tubing used in the manufacture of electric incandescent lamps. In order to obviate these difficulties I have removed all control of the chilling, cutting and delivery devices from the chain conveyer, so that the chain conveyer has only to draw the cane and tubing and, after the sections are automatically detached by the separate and independent control, carry these sections over the top of the machine and deliver them to a receiving means on the opposite side during the downward movement of the grippers. More specifically, I provide an individual driving connection between the motor and the continuous conveyer and independent driving connections between the motor and the various controlling and actuating devices for driving and actuating these devices in synchronism with the conveyer. By this means, and particularly by the specific arrangement hereinafter set forth, I am enabled to increase considerably the speed of drawing and the output of the machine without appreciably increasing the percentage in breakage, the fracturing impacts received by the conveyer from the various controlling devices being thereby reduced to a minimum or entirely eliminated.

The various features of novelty of my machine, as above indicated, and other advantageous features, can best be understood by reference to the following drawings:

Figure 1 is a view of the delivery side of the machine.

Fig. 2 is a side elevation thereof.

Fig. 3 is an enlarged view partly in section of the driving and control connections, and Fig. 4 is a view at right angles to Fig. 3.

Referring to the drawings, a base 1 is suitably mounted over a container 2, containing therein the molten glass, and upon the base 1 is mounted a vertically disposed standard 3 over which runs a continuous conveyer 4 on sprockets mounted in the forked ends of the standard. The carrier 4 has mounted at suitable intervals thereon gripping or drawing devices 5, which in their upward movement on the conveyer are caused to grip and draw upwardly the cane glass 6, and after the cane or tube sections are detached by the detaching devices hereinafter described carry the detached sections up over the uppermost end of the standard and deliver them to any suitable receiving means during their downward journey, as delivery arms 8. It is understood that the gripping devices are caused to operate at the proper time and to travel in well defined paths, as, for instance, in the manner set forth in the above noted application. The manner of operating and controlling these devices throughout the travel is of no particular concern in this application and is, therefore, not particularly and specifically set forth.

The base 1 carries a motor 9, which motor through a vertically disposed counter-shaft 10 drives the uppermost sprocket 11, causing the continuous operation of the chain carrier 4. The motor 9 drives the vertical shaft 10 through an intermediate gearing 12, and the shaft 10 drives the upper sprocket 11 through gearing 13, one of the latter intermeshing gears being mounted on shaft 10, and the other on the overhanging end of the shaft of sprocket 11.

The standard 3 carries substantially midway its ends a bracket 15, the latter carrying independent driving and controlling connections for the chilling, cutting and delivery devices. The bracket 15 has journaled therein a horizontally disposed actuating shaft 17, and embodies a casing 16 through which passes the vertical shaft 10. The shaft 17 carries on an overhanging end a beveled gear 18 and is continuously driven in synchronism with the chain conveyer 4 and the vertical driving shaft 10 by means of a countershaft 19, the latter having a beveled gear on its upper end meshing with the beveled gear 18 and having on its lower end a pinion meshing with a corresponding pinion on the shaft 10. The horizontal shaft 17 also carries on the overhanging end an eccentric 20, as shown, being integral with the gear 18, and this eccentric actuates a bell crank lever 21 through a connecting rod 22. The cutting devices are fixed to the bell crank 21 and, through the shaft 17 and eccentric 20, are caused to move back and forth out of and into the path of the ascending gripping devices 5 to detach the cane sections. In the Quackenbush and Smedley machine above referred to these cutting devices are biased by a spring into the path of the grippers and are moved out of the path of the ascending grippers by the grippers coming into engagement therewith. In the present invention the ascending grippers 5 do not come into engagement with the cutter frame and hence the chain conveyer is not subjected to the blows or poundings between the ascending grippers and the cutter frame which result in abnormally increasing the breakage of the cane and tubing when the speed of the machine is increased beyond certain limits. This difficulty is overcome by the independent connection shown for actuating the cutters independently of but in synchronism with the chain conveyer, and the machine may be run at higher speeds. It is understood that when the cutters 23, 24 are swung in a counter-clockwise direction (Fig. 4) through the mechanism above described these cutters are caused to be sprung away from each other and set in a cutting position. Referring to Fig. 3, the right hand cutter 23 is rigidly mounted on the cutter frame, whereas the left hand cutter 24 is pivoted thereon and has fixed thereto an arm 25 through which passes the tie rod 26. When the cutter frame is swung outwardly out of the path of the ascending grippers the arm 25 engages a suitable shoulder on the tie rod 26 and this causes the left hand cutter to be drawn away from the stationary cutter 23 against the tension of a spring 7 shown in dotted lines in Fig. 3, and at the limit of the movement a latch 27 is caused to engage a heel on the pivoted cutter 24 and retain the same in the sprung or set position. The cutters maintain this position until they are carried back into the path of the ascending grippers and embrace the cane glass 6 (Figs. 2 and 4). When this return position is reached the latch 27 is tripped, releasing the cutter 24, which under the influence of the actuating spring 7 causes the two cutters 23 and 24 to come together and deliver a severing blow to the cane glass sufficient to detach a section from the upper end. This tripping mechanism embodies a bell crank lever 28, pivoted on the arm 21, and a connecting rod 29 pivoted at one end to one arm of the bell crank lever 28 and pivoted at the other end to the eccentric 20. The free arm of the lever 28 is adapted to engage a shoulder on a trip rod 30 which is pivoted to an arm of a bell crank lever, the latch 27 constituting the other arm of the latter. The free arm of the bell crank lever 28 has pivoted thereto a sliding sleeve 31 which slides on the rod 30 and engages a shoulder thereon for tripping the latch 27 at the proper time for cutting the cane as hereinbefore described. A suitable spring as illustrated is located between the sleeve 31 and a shoulder on the outer end of the rod 30 for urging the rod 30 in a downward direction and causing the latch 27 to engage the heel on the cutter 24 when the latter is sprung back to cutting position.

The delivery devices 8 consist of coöperating delivery arms mounted upon a pivoted frame 32 and this frame is adapted to be swung back and forth synchronously with the releasing of the detached cane sections from the grippers 5, the frame 32 being timed to swing into the path of the descending cane sections and to receive them when released from the grippers and to swing back again to deliver the released sections to a depository (not shown). This swinging movement is brought about by means of a crank arm 33 on the end of the horizontal shaft 17, an arm 34 on framework 32 and a connecting rod 35 between these two arms.

The cooling and chilling devices 36 are mounted upon an adjustable framework 130 comprising parallel pipes 37 for delivering a cooling fluid to the cooler, the adjustment being initially made by a hand wheel 38, which may be suitably geared to the adjustable framework. For automatically adjusting and lowering the cooling and chilling devices to correspond to the lowering of the level of the molten glass in the container 2 as the glass is drawn out, a ratcheting device 39 is mounted on a shaft 41, the latter being geared to the hand wheel 38. A connecting rod 40 connects the actuating lever of this ratcheting device with the oscillating frame 32 and as the latter is swung to and fro by the crank arm 33 the ratcheting device through the connecting rod 40 is caused to lower the cooling devices 36 a predetermined distance with each section of cane glass drawn out of the container.

In the machine of the application above referred to the oscillating frame 32 is actuated through a sprocket and chain mechanism directly from the grippers. The control in the present application is effected through the connections shown which are entirely independent of the grippers and chain conveyer, and this enables the speed of cane production to be substantially increased without increasing the cane breakage.

The cooling devices, delivery devices and the cutting devices are more specifically set forth in the Quackenbush and Smedley application above referred to, to which reference may be had for further details, the latter not being claimed *per se* in this case.

What I claim as new and desire to secure by Letters Patent of the United States, is:—

1. The combination of a conveyer for glass cane or tubing, driving means for said conveyer, a frame for supporting the aforesaid means and a severing means also carried by the said frame and actuated by the aforesaid driving means comprising a cutter and means for causing the same to strike against the said cane or tubing at certain intervals.

2. The combination of an endless chain conveyer carrying members for gripping glass cane or tubing and severing means comprising a spring actuated cutter member and mechanism for latching said cutter member in open position and for subsequently releasing the same, said mechanism being actuated independently of said conveyer.

3. The combination of an endless chain conveyer carrying grippers for engaging glass cane or tubing and a severing means comprising a pair of cutting jaws adapted to approach each other at intervals to strike a hammer blow against said cane or tubing and mechanism for opening and closing said jaws controlled independently of the said conveyer.

4. The combination of an endless chain conveyer having grippers for engaging glass cane or tubing, a frame for supporting said conveyer and severing means carried by said frame comprising a pair of cutters, one of which is pivotally mounted to alternately approach and recede from the other said members, a spring against which the movable member opens, latching means for holding said member in the open position, mechanism for periodically releasing said latching means and means for driving said conveyer and for independently actuating the said latching and releasing mechanisms.

In witness whereof, I have hereunto set my hand this 18th day of December, 1916.

JAMES C. SMEDLEY.